United States Patent [19]
Burberry

[11] 3,897,687
[45] Aug. 5, 1975

[54] COMPOSITE SAMPLER

[76] Inventor: Robert H. Burberry, 17 Mickey Rd., Shelby, Ohio 44875

[22] Filed: Sept. 17, 1974

[21] Appl. No.: 506,886

Related U.S. Application Data

[63] Continuation-in-part of Ser. No. 385,395, Aug. 3, 1973, abandoned.

[52] U.S. Cl. .............................................. 73/422 R
[51] Int. Cl.² ........................................... G01N 1/10
[58] Field of Search .......... 73/421 R, 421 B, 422 R, 73/422 TC; 222/203

[56] References Cited
UNITED STATES PATENTS

| | | | |
|---|---|---|---|
| 1,165,667 | 12/1915 | Hage | 222/205 |
| 2,348,806 | 5/1944 | Gillard et al. | 73/421 B |
| 2,836,978 | 6/1958 | Warren | 73/422 |

Primary Examiner—S. Clement Swisher
Attorney, Agent, or Firm—Frank H. Foster

[57] ABSTRACT

A composite sampler for periodically withdrawing consistently representative and accurately measured samples of a primarily liquid body and automatically depositing the samples in a temperature stabilized sample storage receptacle. The sampler comprises a U-shaped smoothly curved tube of uniform cross-section with an electrically operable sample exhaust valve at the bottom and a pump for pumping the liquid through the tube prior to exhausting a sample. A vertically adjustable flexible tube is connected to the U-shaped tube for selectively adjusting the sample volume.

13 Claims, 5 Drawing Figures

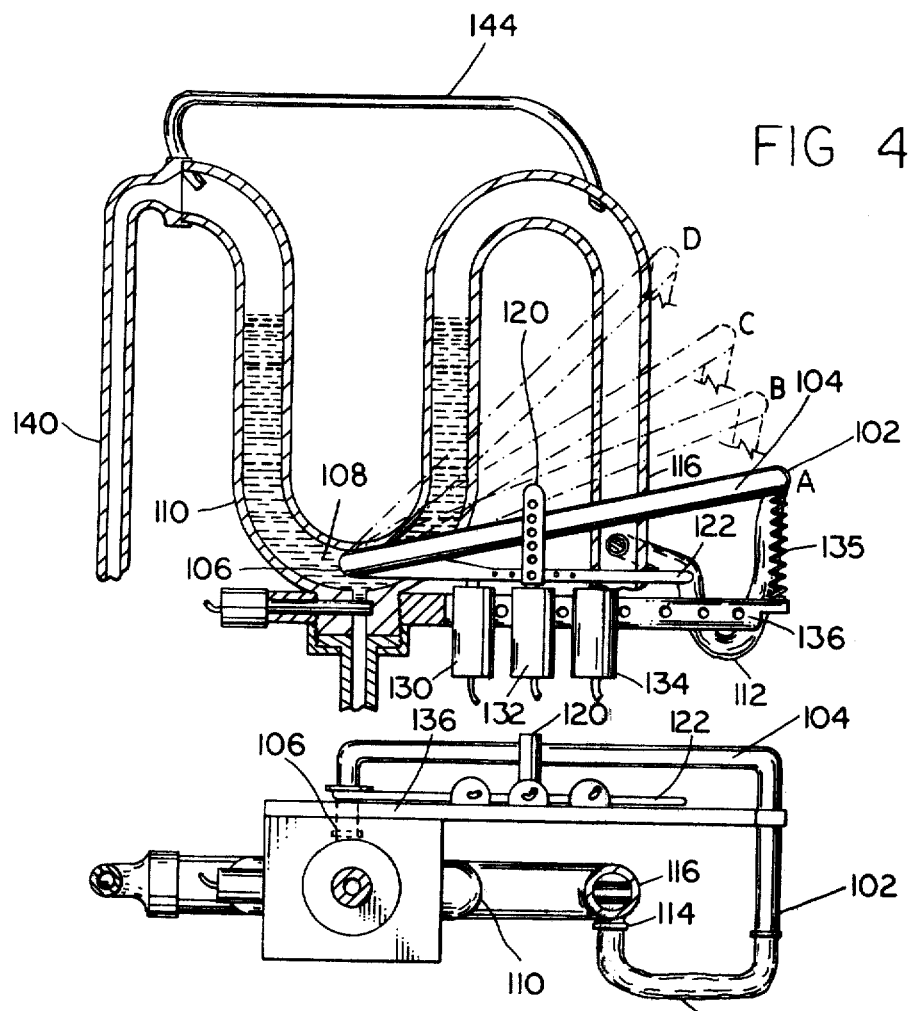

COMPOSITE SAMPLER

BACKGROUND

This application is a continuation-in-part of my copending prior application Ser. No. 385,395, filed Aug. 3, 1973, now abandoned.

This invention relates generally to measuring and testing apparatus and more particularly relates to an apparatus for automatically and periodically withdrawing representative samples of a liquid body and for collecting such samples for subsequent testing.

Recent concern for environmental conditions has brought about a need to periodically determine and measure the content and composition of air and water. In some instances legislation requires such periodic testing. In testing liquids such as those contained in enclosed containers for example, raw, settled or final liquids in water and sewage treatment plants, or liquids contained in natural or man-made bodies of water such as lakes, rivers, or ponds, it is common for a governmental or industrial employee to periodically go to the side of the body of liquid and manually withdraw a sample. The sample is then carried to a laboratory for appropriate testing. This procedure is quite time consuming and expensive and exposes the test results to a substantial possibility of human error.

I have personally timed sample collectors at a small plant and have found that the time required for collecting a single sample is 10 minutes of each hour. This of course amounts to 3 hours per day or 1,095 hours per year spent in obtaining samples. Consequently, the labor savings of such a device could be considerable.

There is therefore a need for a device which can automatically withdraw such samples and store them in a container in which they are preserved as accurate, representative samples of the body of liquid from which they were withdrawn.

Environmental protection agency standarization methods relating to sewage treatment in the near future will be imposed on large and small factories, trailer parks, package plants, reservoirs and many other places dealing with bodies of liquid. These standards will call for monitoring of, for example, of all effluents dumped into streams and rivers.

One difficulty encountered in past sampling apparatus is the problem of obtaining a truly representative sample of the body of liquid. Most liquids to be samped contain dispersed particulate matter or solids which have a tendency to settle out in sampling machines and to clog such machines thereby giving a sample which does not contain the same proportion of solids as contained in the body of liquid to be tested. There is therefore a need for a machine which not only is not subject to significant clogging but will withdraw a sample which truly includes the same proportions of solid particles as contained in the entire body to be tested.

SUMMARY OF THE INVENTION

The invention is a composite sampler for periodically withdrawing a representative sample of a selected volume from a body of liquid. The sampler comprises a sampling body having an enclosed liquid passage leading in an operable position from an inlet port downwardly to a bottom portion and then upwardly to an outlet port. An inlet conduit is connected between the inlet port and the body of liquid for conveying liquid to the passage. Means is connected in communication with the passage for at times pumping liquid through the passage. A sample withdrawal valve is connected in communication with the passage at the bottom portion for at times being opened to exhaust a sample.

It is therefore an object of the invention to provide an improved composite sampler.

Another object of the invention is to provide a composite sampler which provides an accurately measured and truly representative sample of the body of liquid to be tested.

Another object of the invention is to provide a composite sampler which is not subject to any clogging which could damage the operation and sampling characteristics of the composite sampler.

Another object of the invention is to provide a composite sampler which preserves the withdrawn samples in the same state as they exist in the body of liquid.

Another object of the invention is to provide a sampler which is very easily adjusted to control the volume of the withdrawn sample.

Further objects and features of the invention will be apparent from the following specification and claims when considered in connection with the accompanying drawings illustrating the preferred embodiment of the invention.

DESCRIPTION OF THE DRAWINGS

FIG. 4 is a view in vertical section of the U-shaped tube and its associated structures.

FIG. 5 is a bottom view of the structure illustrated in FIG. 4.

Figure 1:
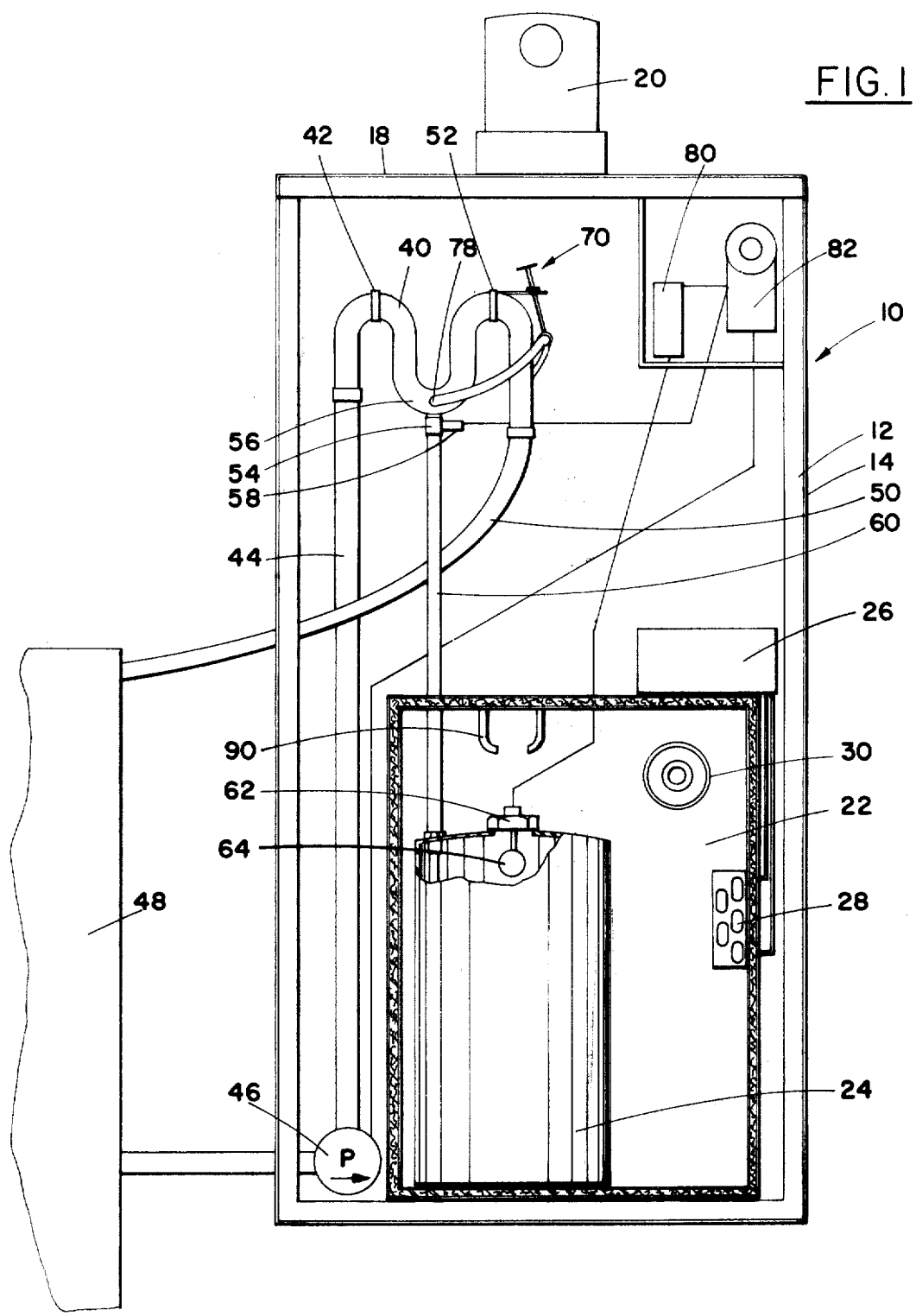
FIG. 1 is a view in side elevation of the preferred embodiment of the invention having a panel of its exterior cabinet removed to reveal the interior working mechanisms.

In describing the preferred embodiments of the invention illustrated in the drawings, specific terminology will be resorted to for the sake of clarity. However, it is not intended to be limited to the specific terms so selected and it is to be understood that specific terms include all technical equivalents which operate in a similar manner to accomplish a similar purpose.

DETAILED DESCRIPTION

Referring to FIG. 1, the preferred embodiment of the invention is housed in a cabinet 10 formed of aluminum framing members 12 on which an outer skin, including side panels 14 and 16 and top panel 18, are fastened. An alarm or signal light 20 is mounted on top of the cabinet 10. Protectively secured within the cabinet 10 is a thermally insulated compartment 22 which contains a sample storage receptacle 24. The insulated compartment 22 is stably maintained within a temperature range which prevents freezing of the samples and yet is cool enough to preserve the sample contents in the identical state as when they were withdrawn. This compartment 22 is refrigerated in summer by a refrigeration unit 26 connected to suitable cooling coils 28. In winter, the compartment is heated by heating coils 30 controlled by a suitable temperature control system. Both the heating and cooling systems are thermostatically controlled and operate in a conventional manner well known to those skilled in the art.

Mounted in the upper portion of the cabinet 10 is a sampling body 40 which is shaped as a generally U-shaped, smoothly curved tube of substantially uniform cross-section. The U-shaped tube 40 is coupled by coupler 42 to an inlet conduit 44 which extends through a pump 46 to a body of liquid illustrated diagrammatically as 48. This body of liquid 48 could be contained within a receptacle or could represent a natural or artificial body of water. An effluent conduit 50 is connected by coupling 52 through the opposite side of the U-shaped tube 40. It extends back to the body of liquid 48 for returning excess liquid to the liquid body 48 at a location away from the location of the inlet so as not to disturb the portion of the liquid at which samples are being withdrawn.

In order to provide a source of air for replacing liquid which drains away when the pump 46 stops pumping, a tube 92 is connected in communication with the upper parts or crests of the U-shaped tube 40. This tube 92 is in turn connected by a Tee 94 to a check valve 96 and then is vented to the atmosphere. Air can be drawn into the U-shaped tube 40 and its inlet and effluent conduits 44 and 50 but liquid can not be exhausted. Therefore when pump 46 stops, this air can replace the liquid which drains away from the U-shaped tube in both the inlet conduit 44 and the effluent conduit 50.

A sample withdrawal valve 54 is connected in the bottom portion 56 of the U-shaped tube 40 and is operated by a solenoid 58. The solenoid 58 is at times actuated to open the valve 54 and pass a measured sample through the sample conduit 60 into the sample storage receptacle 24.

An electrical switch is mounted in the cap 62 of the sample storage receptacle 24 and is actuated by the float 64 to illuminate the signal light 20 when the receptacle 24 is filled with collected samples.

Figure 2:
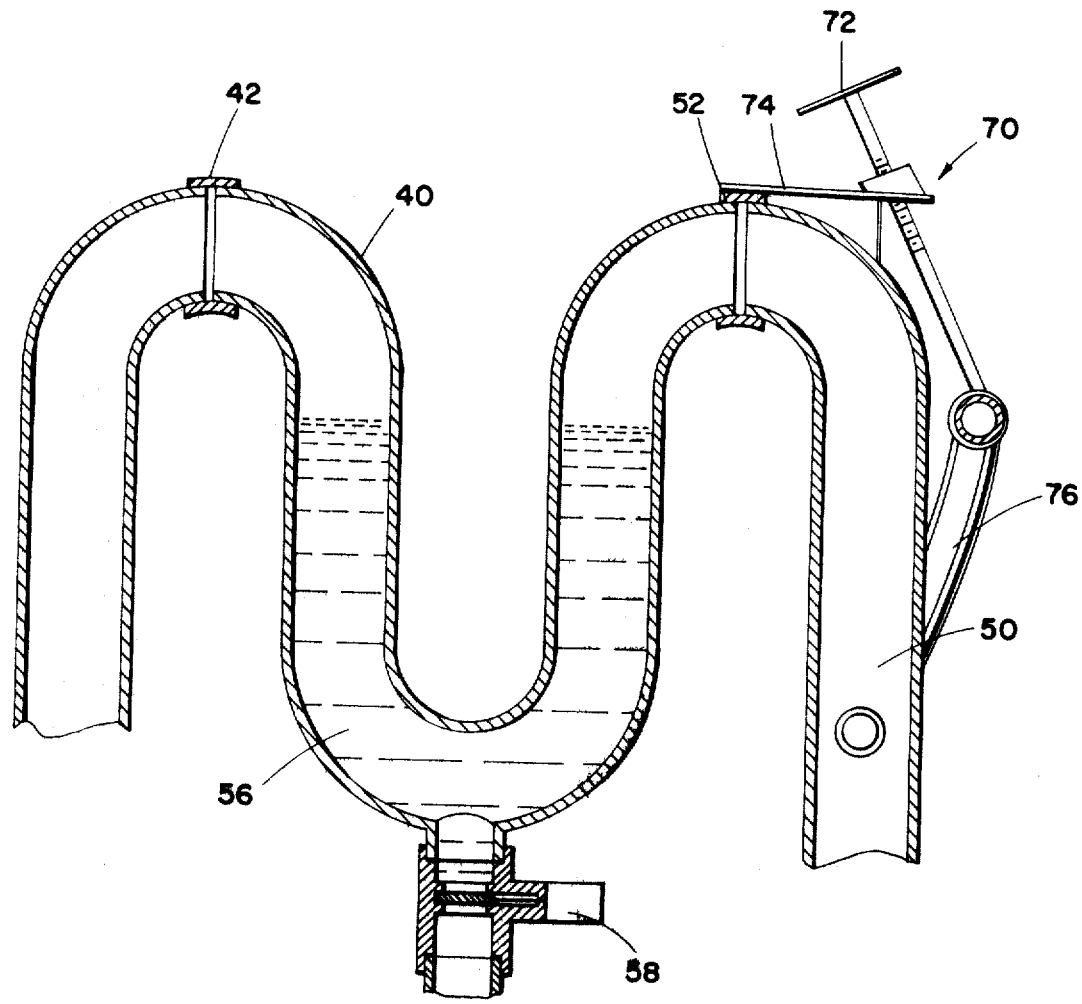
FIG. 2 is a view in vertical section of the sampling tube portion of the embodiment illustrated in FIG. 1.

Referring now to both FIGS. 1 and 2 for the detailed structure of the sampling body and associated apparatus, the sampling body may be considered as having, in an operable position, an inlet port within the coupling 42 for example, and a passage which leads from the inlet port downwardly to a bottom portion 56 and thence upwardly to an outlet port for example within the coupling 52.

A sample volume selecting means is connected to the sampling body and is manually adjustable. It includes a vertically adjustable support means indicated generally as 70 which has a thumb screw 72 threadedly engaged to a support arm 74. An intermediate segment of a flexible tube 76 is mounted to the bottom of the thumb screw 72 so that it may be rasied or lowered by rotation of the thumb screw 72. One end of the flexible tube 76 is connected by a swivel coupling 78 into communication with the bottom portion of the passage through the U-shaped tube 40. The opposite end of the flexible tube 76 extends into communication with the effluent conduit 50 at a level below the outlet port of the coupling 52 and at or preferably below the bottom portion 56 of the U-shaped tube 40.

An electrical control system 80 and control timer 82 are mounted within the cabinet 10 and are connected to the electrical components of the composite sampler for controlling their operation. For example, the control timer 82 once every hour will actuate the pump 46 for a period of 15 to 30 seconds for example. It will then deenergize the pump for a brief time interval of for example 15 seconds. Then it will actuate the solenoid 68 for a time interval of 10 or 15 seconds for example, to withdraw a sample into the sample storage receptacle 24. The solenoid is then deenergized.

The float actuated switch contained within the cap 62 is also connected to the control circuit 80 in order to shut down and prevent further operation of the composite sampler once the sample storage receptacle 24 has been filed, but allowing the refrigeration unit to operate. The system therefore can not overflow in the event of malfunction or of a failure to make timely collections of samples.

OPERATION

The operation of the preferred embodiment of the invention can be considered to begin with all tubes and conduits entirely empty and clean. Once each hour, or at whatever periodic intervals as desired, the control timer 82 will actuate the pump 46. The pump will cause a smooth and continuous flow of liquid from the liquid body 48 to flow through the U-shaped tube 40, out the effluent tube 50 and back into the liquid body 48. In this manner, a continuous, recycled flow is created. After a period of around 30 seconds, the material flowing through the U-shaped tube will be uniform and will be truly representative of the material contained within the liquid body 48. Because the liquid flows smoothly and continuously for such a period of time, the sample will be truly representative. The solid particulate matter will be unable to settle in any portion of the apparatus. There are, first of all, no portions of the fluid passages which are not subjected to a sweeping current of liquid. Secondly, there are no areas such as corners or crevasses in which the liquid stands to permit the particulate matter to settle.

After a flow of uniform material is established, the pump is shut off and the liquid which is not within the U-shaped tube 40 flows by gravity back into the liquid body 48 and simultaneously helps clean the inlet conduit and pump. For this reason, it is desirable that the pump 46 be a pump which permits gravity flow therethrough. A centrifugal pump can be used if it is below the liquid level or if it is submerged in the liquid instead of being mounted in the cabinet. Otherwise, the pump 46 must be self priming.

As soon as the pump is deenergized, the liquid in the U-shaped tube will drop to a level identical with the level of the top portion of the flexible tube 76. Thus, liquid trapped in the U-shaped tube 40 after the pump 46 is deenergized quickly flows through the flexible tube 76 and into the effluent conduit 50 until it reaches the level of the top portion of the flexible tube 76. Thus, the height of the liquid level finally resulting in the U-shaped tube 40 is accurately controllable by rotation of the thumb screw 72.

Therefore it can be seen that the liquid trapped in the U-shaped tube 40 is of a selected volume and has a composition identical with the composition of the liquid in the liquid body 48. The control timer 82 now energizes the solenoid 58 to open the sample withdrawal valve 54. The entirety of the liquid contents in the U-shaped tube 40 plus some minute quantity of liquid in half of the flexible tube 76 now flows quickly by gravity through the sample withdrawal tube 60 into the sample storage receptacle 24. The control timer 82 then closes the sample withdrawal valve 54 and the cycle may be repeated as desired.

Employees may then daily, weekly, monthly, or at whatever intervals are desired stop by the automatic composite sampling unit and withdraw the filled sample storage receptacle 24 and replace it with a similar empty tank for collection of further samples.

Alternatively, the composite sampler may be periodically checked from afar such as from a passing car by observing the light 20.

The temperature of the sample storage receptacle 24 is preferably retained in the range of 38° to 46°F. Moreover, the primary considerations are that the temperatures be warm enough to prevent freezing of the samples and yet be cool enough to prevent the chemical or bacteriological change of the sample material.

As an alternative embodiment of the invention, it can be appreciated that the invention can be modified to include several sampling bodies and/or several sample storage receptacles within the same cabinet. I have found it convenient to provide a hanger or support bracket 90 on the underside of the top of the insulated receptacle 22 to conveniently support the removable cap 62 when replacing the sample storage receptacle 24.

For some applications, such as in remote areas, especially in climates which do not require refrigeration or heating equipment, the energy demands of this system can be supplied by batteries.

Figure 3:
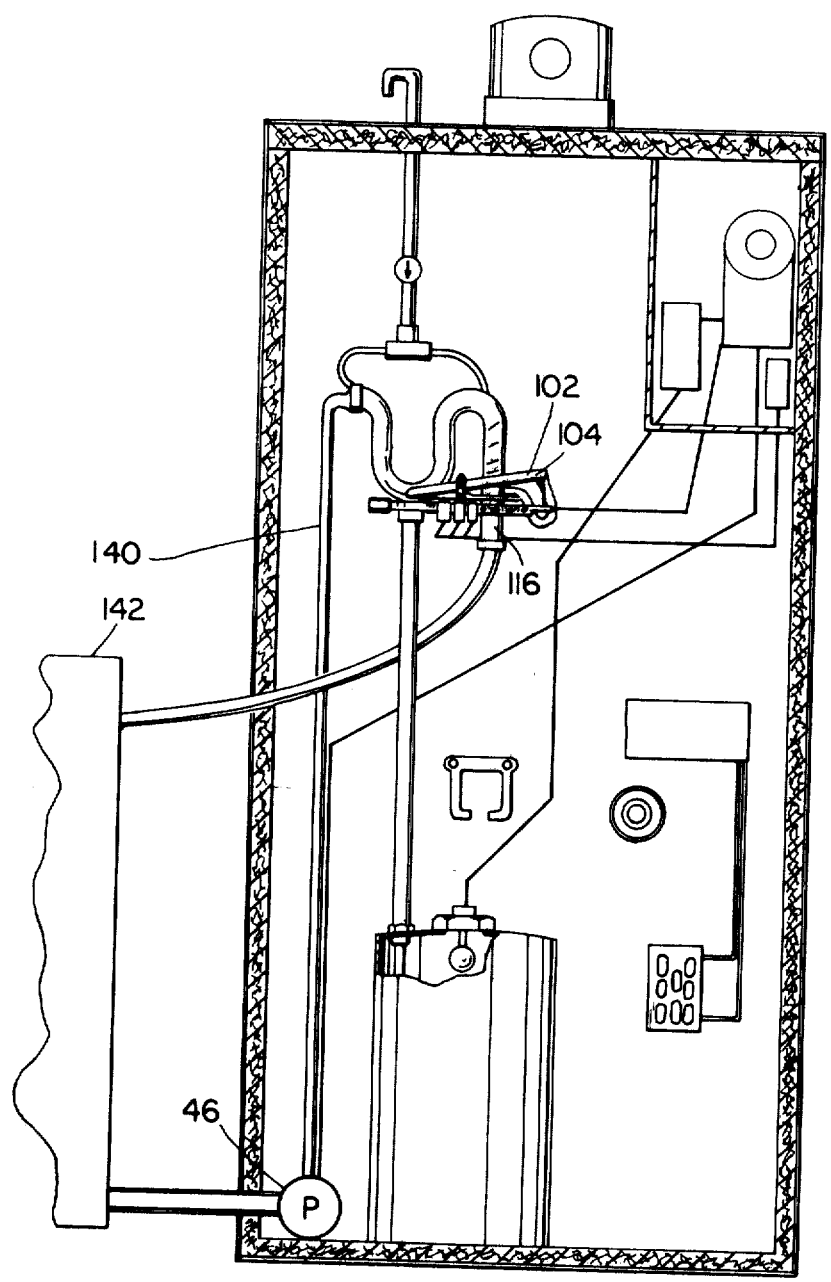
FIG. 3 is a view of an alternative embodiment of the invention with the cabinet in vertical section.

FIGS. 3 through 5 illustrate an improved embodiment of the invention which is provided with a proportional flow control system.

The demand upon and the activity of many sewage and waste collection systems may vary greatly during a time period. For example, the demand upon the sewage system of a commercial building may be very minor at night but increase during the day. A maximum demand might be experienced at certain times during the day. It is desirable to take larger samples during times of great demand so that the composite sample collected in the container will be truly representative. Thus a proportional flow system takes samples having a volume which is proportional to the activity of the system.

In waste collection systems which utilize pumps to circulate the liquid, a plurality of pumps are commonly connected in parallel fluid connection. In this manner the pumping capacity may be increased in response to demand by operating additional pumps. Typically, these pumps are electrically actuated by floats or other devices which automatically respond to the demand of the system and energize more pumps during times of increased demand.

The apparatus illustrated in FIGS. 3–5 is, in many respects, like that illustrated in FIGS. 1 and 2 but with certain modifications which are described.

The entire cabinet is insulated so that all of the mechanisms are protected from temperature extremes. Most importantly, the pump and the liquid-conveying conduits are prevented from freezing.

The manually adjustable flexible tube 76 of FIGS. 1 and 2 has been replaced with a proportional flow apparatus. This proportional flow apparatus has a fluid conducting tube 102 the height of which determines the sample size for the same reasons that the height of tube 76 regulates the sample size in the embodiment of FIG. 1.

The fluid conducting tube 102 in part consists of a rigid tube 104 which is connected by a swivel connector 106 into communication with the bottom portion 108 of the U-shaped tube 110. The other part of the fluid conducting tube 102 consists of a flexible tube 112 which is coupled at one end to the end of the rigid tube 104 and at its other end to a swivel 114 in communication with the effluent conduit 116.

The rigid tube 104 is supported intermediate its end by a support strut 120 which is fixed to and extends outwardly and upwardly from a pivotal, lever arm 122. The pivotal, lever arm 122 is pivotable coaxially with the rigid tube 104. Therefore the rigid tube 104 and the lever arm 122 may pivot in unison about the axis of the swivel 106. However, the support strut 120 is provided with a plurality of vertically spaced holes so that the angle between the rigid tube 104 and the lever arm 122 may be selected by fixing the rigid tube 104 to a selected hole in the strut 120.

Immediately below the lever arm 122 are a plurality of solenoids 130, 132 and 134 which are fixedly mounted to three flanges which extend horizontally from a support beam 136 which in turn is fixed to the bottom of the U-shaped tube 116. The plungers of the solenoids are arranged in vertical registration below the lever so that, when the solenoids are actuated, their plungers pivotally lift the lever arm 122 and therefore also the tube 102 carried by it.

However, the solenoids are at different radial distances from the pivot axis and consequently the closer a solenoid to the pivot axis the higher the tube 102 will be raised and the larger will be the sample.

With no solenoids energized the tube 102 will be at position A and the smallest sample will be collected. With solenoid 134 energized the tube will be at position B and a larger sample will be collected. Solenoids 132 and 130 will raise the tube 102 to levels C and D respectively. A light tension spring 135 is anchored at opposite ends to the support beam 136 and the tube 102 to assist and assure the proper return of the tube 102 when the solenoids are deenergized.

The solenoids may be electrically connected in parallel to respective ones of three pumps of a three pump waste system if they have similar voltage requirements or to the relays which control the pumps.

They are electrically connected so that when a single pump is energized solenoid 134 is simultaneously energized. The second pump will energize solenoid 132 and the third pump will energize solenoid 130.

Therefore, with no pumps the sample size will correspond to position A, one pump to position B, two pumps to position C and three pumps to position D.

An electrical master switch can advantageously be placed to open the circuit to the solenoids from their pump controlled sources of power so that the pump operation will not effect the sample size. In addition three individual, manually operated switches can be connected in the solenoid circuits so that they can be manually energized. Therefore by disconnection of the system from the pumps, the sample size can be manually selected from time to time. Of course alternative manual control can be obtained by an adjustment screw like that of FIGS. 1 and 2 which would be disconnected for automatic operation.

The solenoids are advantageously equipped with retarding dampers so that the solenoid plungers will not snap up or down immediately and potentially damage the tubes or other structure. A typical device is a piston and spring structure.

The inlet conduit 140 may advantageously be made of a smaller diameter tubular conduit than the diameter of the remaining fluid path so that the effluent conduit 116 will never become entirely filled with liquid. If the end of the effluent tube 116 which extends into the liquid body container 142 is kept above the surface of the liquid body in the container 142, then air can enter the upper portion of the U-shaped tube 110 through the effluent conduit 116. Therefore the check valve and tee of FIGS. 1 and 2 can be eliminated leaving a single tube 144 for supplying air to the inlet side of the U-shaped tube 110. However, the entire air inlet system can be used and therefore is illustrated in FIG. 3 although not in FIG. 4.

Another advantageous alternative structural feature of the present invention is that the U-shaped tube 110 can be manufactured of a clear, transparent plastic with graduations and a volumetric scale etched or printed on it. These would facilitate all adjustments so that sample sizes can be directly read.

Radially aligned graduations and a volumetric scale can be also printed on the effluent tube so that they register with angular positions of the rigid tube 104 to permit an operator to directly read the sample size which corresponds to the height of the tube 102.

Additionally, the solenoids can be slidably mounted for lateral adjustment and releasably fixed to the support beam 136. This feature permits the radial distance from the pivot axis of swivel 106 to the solenoid plunger to be adjusted to further control the sample volume.

It is to be understood that while the detailed drawings and specific examples given describe preferred embodiments of the invention, they are for the purposes of illustration only that the apparatus of the invention is not limited to the precise details and conditions disclosed and that various changes may be made therein without departing from the spirit of the invention which is defined by the following claims.

What is claimed is:

1. A composite sampler for periodically withdrawing a representative sample of a selected volume from a body of liquid, the sampler comprising:
   a. a sampling body having an enclosed liquid passage leading, in an operable position, from an inlet port downwardly to a bottom portion and thence upwardly to an outlet port, said passage being smoothly curved and having a substantially uniform cross sectional area;
   b. an inlet conduit connected between said inlet port and said body of liquid for conveying liquid to said passage;
   c. means connected in communication with said passage for at times pumping liquid through said passage;
   d. a sample withdrawal valve connected in communication with said passage at said bottom portion for at times being opened to exhaust a sample; and
   e. means connected to communication with said passage to permit in input of air to prevent a siphon action.

2. A sampler according to claim 1 wherein said sampling body comprises a generally U-shaped smoothly curved tube of substantially uniform cross section.

3. A sampler according to claim 1 wherein a sample storage receptacle is mounted below said sampling body and is connected into communication with said withdrawal valve and wherein a control means is provided for periodically operating said pump means for a selected period of time and for subsequently operating said withdrawal valve to exhaust a sample into said sample storage receptacle.

4. A sampler according to claim 3 wherein said receptacle is provided with a float actuated switch connected to an exteriorly visible signalling means and a source of electrical power for signalling when said receptacle is filled to a selected level.

5. A sampler according to claim 4 wherein said float actuated switch is electrically connected to said control for preventing the withdrawal of samples when said receptacle is filled.

6. A sampler according to claim 1 wherein a sample volume selecting means is connected to said sampling body and comprises:
   a. a vertically adjustable support means mounted near said sampling body and positioned for adjusting the level of a segment of flexible tubing in a range including levels within said passage; and
   b. a flexible tube connected into communication with said passage at said bottom portion, supported between its ends by said adjustable support means and extending to a level below said outlet port.

7. A sampler according to claim 6 wherein an effluent conduit is connected from said outlet port to said body of liquid for returning excess liquid to said body of water and wherein one end of said flexible tube is connected in communication with said effluent conduit at a level near the level of said bottom portion of said passage.

8. A sampler according to claim 7 wherein a sample storage receptacle is mounted below said sampling body and is connected into communication with said withdrawal valve and a control means is provided for periodically operating said pump means for a selected period of time and for subsequently operating said withdrawal valve to exhaust a sample into said sample storage receptacle.

9. A sampler according to claim 8 wherein said control means is an electrical control circuit, said pump means is electrically operated and said withdrawal valve is solenoid actuated.

10. A sampler according to claim 9 wherein said sample storage receptacle is housed in an insulated compartment and wherein heating and refrigerating means is connected to said compartment for maintaining the temperature of said compartment in the range of above 32°F and below 60°F.

11. A sampler according to claim 1 wherein a sample volume selecting means is connected to said sampling body and comprises:
   a. a fluid conducting tube connected into communication at one end with said passage at said bottom portion and extending at its opposite end to a level below said outlet port;
   b. a pivotal, supporting lever arm for supporting said fluid conducting tube intermediate its ends and arranged to support said fluid conducting tube in a pivotal range including levels within said passage; and
   c. a plurality of movable plunger means engageable with said lever arm and spaced at different radial distances from the pivot axis of said lever arm for pivoting said plunger means a distance inversely corresponding to the distance from the actuated plunger to the pivot axis.

12. A sampler according to claim 11 wherein said plungers are the plungers of solenoids which are electrically connected to a means for actuating said plungers in response to the activity of said body of liquid.

13. A sampler according to claim 12 wherein said plungers are the plungers of solenoids which are electrically connected to electrical switches.

* * * * *